United States Patent [19]

Semba

[11] Patent Number: 5,542,000
[45] Date of Patent: Jul. 30, 1996

[54] KARAOKE APPARATUS HAVING AUTOMATIC EFFECTOR CONTROL

[75] Inventor: Youji Semba, Hamamatsu, Japan

[73] Assignee: Yamaha Corporation, Hamamatsu, Japan

[21] Appl. No.: 214,789

[22] Filed: Mar. 17, 1994

[30] Foreign Application Priority Data

Mar. 19, 1993 [JP] Japan ..................... 5-085388

[51] Int. Cl.⁶ ............... H03G 3/00; G10H 1/36; G09B 5/04
[52] U.S. Cl. ............. 381/61; 434/307 A; 84/662; 84/666
[58] Field of Search ............... 381/118, 61, 63; 84/630, 634, 662, 666, 701; 434/307 A

[56] References Cited

U.S. PATENT DOCUMENTS 5,027,687  7/1991  Iwamatsu ............... 381/18
5,261,005  11/1993  Masayuki ............... 84/600
5,296,643  3/1994  Kuo et al. ............... 84/634

FOREIGN PATENT DOCUMENTS 403123381A  5/1991  Japan .................. 434/307 A

Primary Examiner—Scott A. Rogers
Assistant Examiner—Jerome Grant, II
Attorney, Agent, or Firm—Loeb & Loeb LLP

[57] ABSTRACT

A karaoke apparatus operates in response to a song request for sounding an automatic accompaniment mixed with a singing voice to produce a karaoke performance involving an additional effect. The karaoke apparatus is supplied with a composite song data containing an accompaniment event data and an additional effect event data. A multimedia sequencer time-sequentially processes the supplied composite song data to synchronously feed a train of the accompaniment event data and another train of the additional effect event data in parallel manner with one another. A tone generator operates based on the fed accompaniment event data for generating an automatic accompaniment so as to produce a karaoke performance. An additional effect equipment is controlled by the fed additional effect event data for imparting an additional effect to the karaoke performance in matching with time-sequential progression thereof.

12 Claims, 6 Drawing Sheets

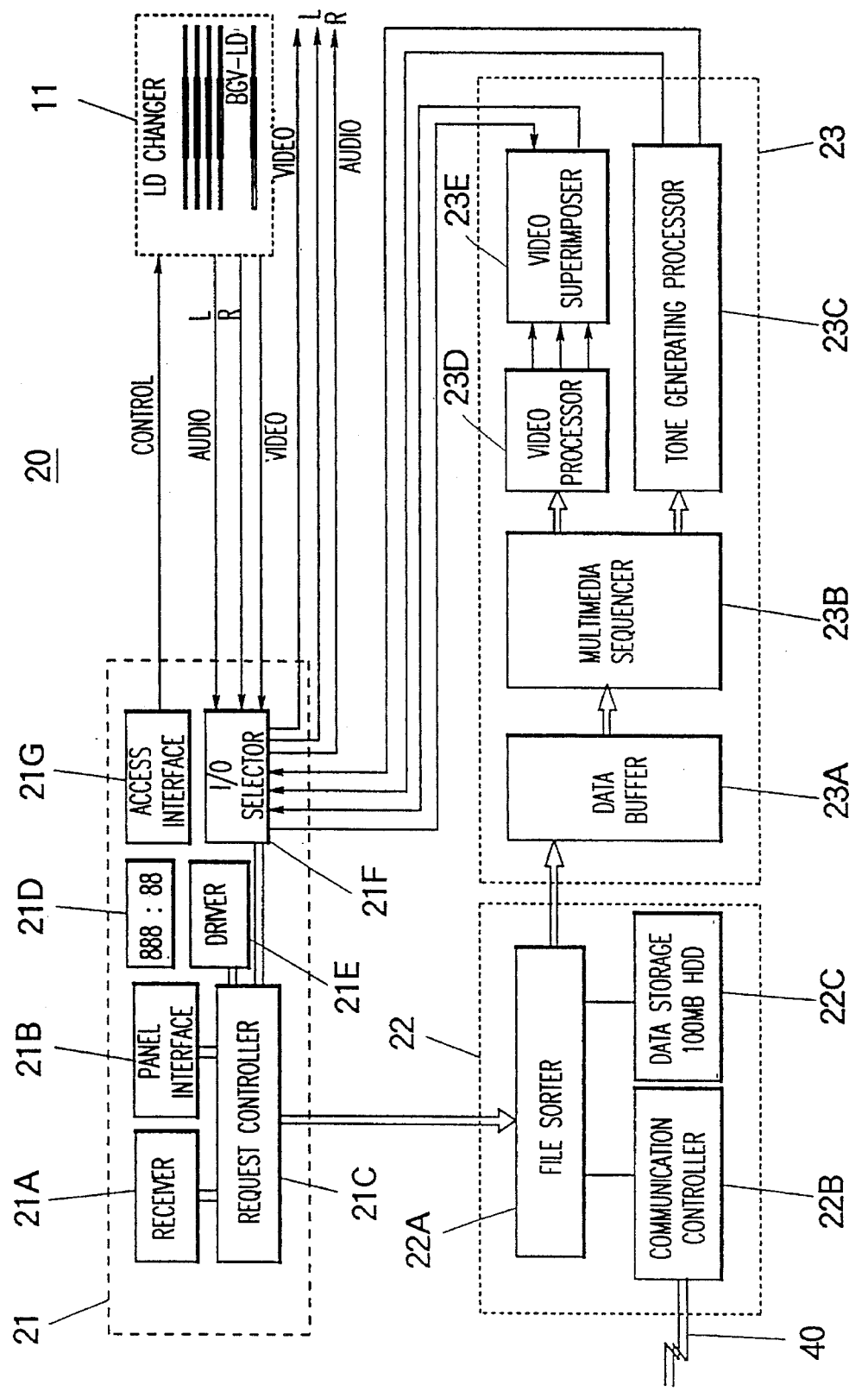

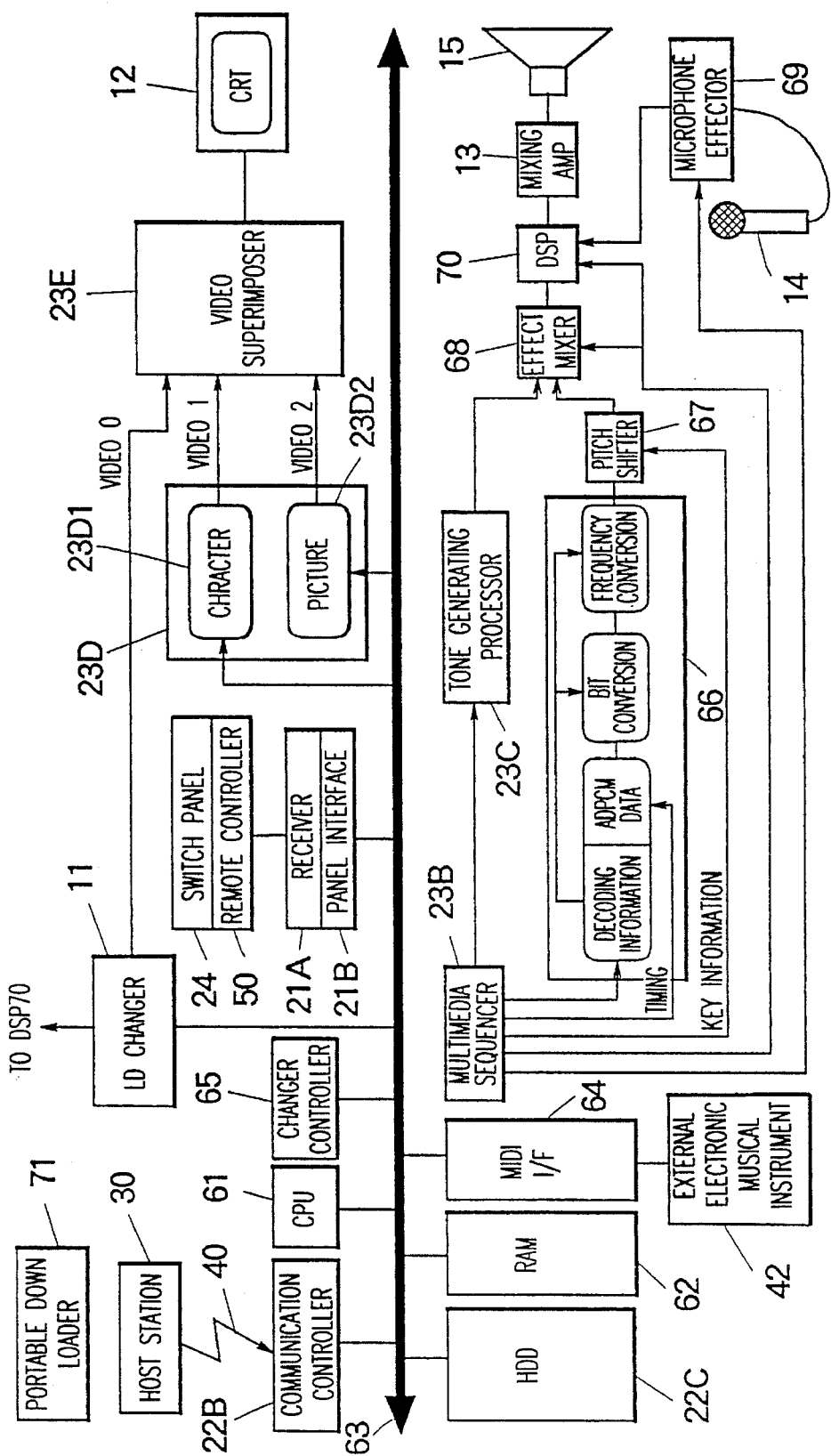

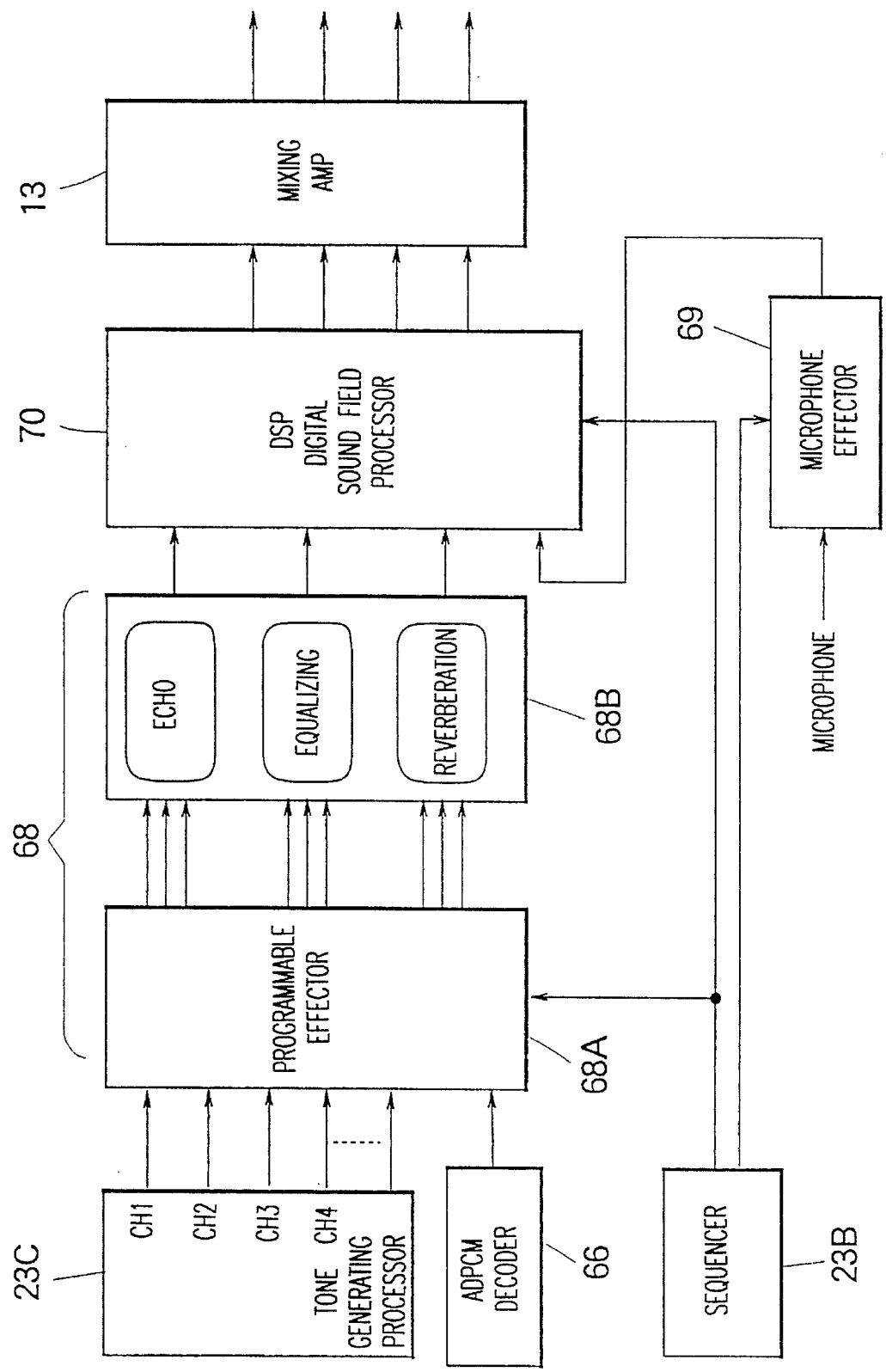

KARAOKE APPARATUS HAVING AUTOMATIC EFFECTOR CONTROL

BACKGROUND OF THE INVENTION

The present invention relates to a karaoke apparatus for automatically controlling a sound field effect, an acoustic (sound) effect and else, which are applied to performed musical tones and singing voices.

A karaoke apparatus is constructed such as to produce an instrumental accompaniment part of a requested song, which is concurrently mixed with a live vocal part of the same song picked up by a microphone. The karaoke apparatus becomes popular, and is installed not only in a bar and a club, but also in a specialized rental room called "karaoke box" and a vehicle such as a tourist bus. The conventional karaoke apparatus is normally a playback type or a musical tone reproduction type composed of a record unit for storing audio information and/or associated video information of karaoke songs, an audio unit for reproducing the karaoke song and mixing a singing voice therewith, a video unit for displaying background pictures and word characters along with the reproduction of the karaoke song, and a control unit for controlling these of the record, audio and video units. Recently, another karaoke apparatus of a synthetic type or a musical tone generating type is developed, which contains a tone generator for synthesizing musical tones according to a song data prescriptive of the karaoke song. Generally, the synthetic karaoke apparatus is connected through a communication network to a host station for retrieving therefrom the song data.

The playback karaoke apparatus has the record unit which is a closed or isolated data source, hence the playback karaoke apparatus cannot respond to a request for a non-entry karaoke song which is not stored in the record unit. On the other hand, the synthetic karaoke apparatus can access a database of the host station to freely retrieve therefrom a desired song data in response to a singer's request. An ultimate type of the synthetic karaoke apparatus is solely dependent on the data telecommunication such that all the requested song data are supplied from the host station without exception. In order to save data communication cost and time required for repeated access to the host station upon every request, a semi-self-support type of the synthetic karaoke apparatus has a storage defining an open data source for stocking the song data supplied from the host station for re-use.

In order to meet various needs of users, the recent karaoke apparatus becomes more and more sophisticated to equip extensive and multiple functions besides the above noted telecommunication function. For one example, a sound field processor is installed to modify the performed karaoke song as if generated in a specific sound field space such as a concert hall and a live spot. For another example, a microphone effector is installed to add various acoustic effects such as echo, excitement and harmonization to the singing voice to thereby enhance much fun of the karaoke performance. However, the conventional karaoke apparatus is designed to control limited main events of the karaoke performance such as generation of the accompaniment tones and display of background pictures and song word characters, while additional events such as the sound field effect and the acoustic effect are manually controlled during the course of the karaoke performance. The conventional karaoke apparatus cannot automatically change the additional effects in matching with a mood of the song during the course of the karaoke performance even though the sound field processor and the microphone effector are installed.

SUMMARY OF THE INVENTION

An object of the present invention is to provide an advanced karaoke apparatus in which a sequencer conducts multiple controls over not only the tone generator and the display but also additional equipments so as to process a karaoke song data containing additional effect event information to thereby automatically set and change the sound field effect, the acoustic effect and else in matching with the mood of the karaoke song.

According to the invention, a karaoke apparatus responsive to a song request for sounding an automatic accompaniment mixed with a singing voice to produce a karaoke performance, comprises supply means responsive to a song request for supplying a composite song data containing an accompaniment event data and an additional effect event data, sequencer means for time-sequentially processing the supplied composite song data to synchronously feed a train of the accompaniment event data and another train of the additional effect event data in parallel manner with one another, tone generator means operative based on the fed accompaniment event data for generating an automatic accompaniment so as to produce a karaoke performance, and additional means controlled by the fed additional effect event data for imparting an additional effect to the karaoke performance in matching with time-sequential progression thereof.

In one specific form, a karaoke apparatus for sounding a karaoke accompaniment in response to a song request, comprises supply means responsive to a song request for supplying a composite song data containing a karaoke accompaniment event data and a sound field effect event data, sequencer means for time-sequentially processing the supplied composite song data to synchronously feed a train of the karaoke accompaniment event data and another train of the sound field effect event data in parallel manner with one another, tone generator means operative based on the fed karaoke accompaniment event data for generating a karaoke accompaniment, and sound field means controlled by the fed sound field effect event data for imparting a sound field effect to the karaoke accompaniment in matching with time-sequential progression of the karaoke accompaniment.

In another specific form, a karaoke apparatus responsive to a song request for sounding a karaoke accompaniment mixed with a singing voice, comprises supply means responsive to a song request for supplying a composite song data containing a karaoke accompaniment event data and an acoustic effect event data, sequencer means for time-sequentially processing the supplied composite song data to synchronously feed a train of the karaoke accompaniment event data and another train of the acoustic effect event data in parallel manner with one another, tone generator means operative based on the fed karaoke accompaniment event data for generating a karaoke accompaniment, and effector means controlled by the fed acoustic effect event data for imparting an acoustic effect to the singing voice in matching with time-sequential progression of the karaoke accompaniment.

In a more general form, a karaoke apparatus responsive to a song request for sounding an automatic accompaniment mixed with a singing voice to produce a karaoke performance involving various kinds of additional multimedia events, comprises supply means responsive to a song request for supplying a composite karaoke data having a main track carrying an accompaniment event data and an additional track carrying various kinds of additional multimedia event data, tone generator means operative based on the supplied main track of the accompaniment event data for generating an automatic accompaniment, multimedia sequencer means for time-sequentially processing the additional track in synchronization with the main track to individually distribute the various kinds of the additional multimedia event data, and various kinds of multimedia equipments controlled by corresponding ones of the distributed additional multimedia event data for carrying out respective additional multimedia events in matching with progression of the automatic accompaniment.

According to the invention, the sequencer means has multiplex functions to carry out multiple tasks in parallel manner. Basically, the sequencer totally controls primary events of the karaoke performance including the tone generation of the accompaniment, and the display of the background picture and the song words. The sequencer further controls secondary or additional events such as the sound field application, the acoustic effect application, the illumination and the stage movement so as to enhance amusement of the karaoke performance.

BRIEF DESCRIPTION OF THE DRAWINGS

FIG. 2 is a block diagram of a total control device incorporated in the inventive karaoke system.

FIG. 3 is a detailed structural diagram of the FIG. 1 system.

FIG. 7 is an operational block diagram showing multiple controls by a multimedia sequencer.

DETAILED DESCRIPTION OF THE INVENTION

Figure 1:
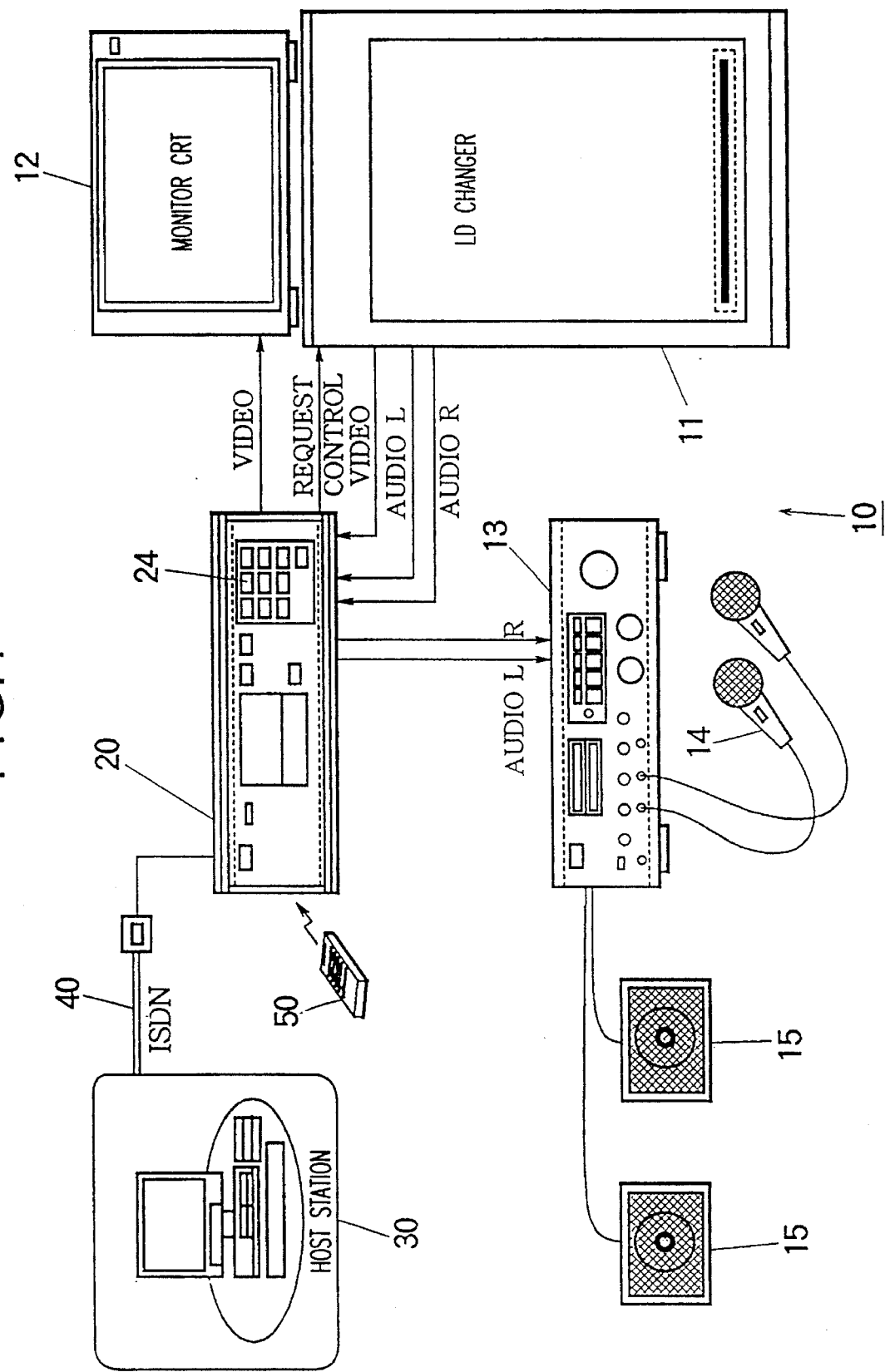
FIG. 1 is an overall block diagram showing an inventive karaoke system.

Hereinafter, embodiments of the invention will be described in conjunction with the drawings. FIG. 1 shows an overall construction of a karaoke system according to the present invention. The system includes a Laser Disc (LD) changer 11, a display in the form of a monitor CRT 12, a mixing amplifier 13, a microphone 14, and a pair of loudspeakers 15, those of which are connected altogether to constitute an ordinary karaoke apparatus 10 of the musical tone reproducing type or the playback type. The inventive system further includes a total control device 20 which contains a tone generating processor and which is connected to those of the monitor CRT 12 and the mixing amplifier 13 to functionally constitute another karaoke apparatus of the musical tone generating type or the synthetic type. This total control device 20 functions as a total system commander connected to a part of the playback type karaoke apparatus 10 so as to build and control the total karaoke system which is an integration of the playback karaoke and the synthetic karaoke. A remote host station 30 is connected to the total control device 20 through a fast digital communication network such as Integrated Services Digital Network (ISDN) and Local Area Network (LAN), or an analog public communication line to transmit thereto a requested song data. A remote controller 50 is provided to input a command such as a song request into the karaoke system.

The playback karaoke apparatus 10 is a self-supporting type such theft the LD changer 11 (i.e., a video disc player) contains a great number of Laser Discs (LDs) as a closed data source. The Laser Disc records a number of karaoke songs and associated words (i.e., lyrics) and background pictures. The LD changer 11 is controlled by the song request to access and select the Laser Discs to output an audio signal AUDIO representative of the requested karaoke song to the mixing amplifier 13 as well as to output a video signal VIDEO representative of the associated words and pictures. The mixing amplifier 13 mixes a live singing voice of a singer picked up by the microphone 14, with a karaoke accompaniment of the requested song. The loudspeaker 15 acoustically transmits the mixed sound of the voice and the accompaniment to produce karaoke performance. Concurrently, the monitor CRT 12 displays the song words and the background picture associated to the requested karaoke song to assist in the vocal performance of the singer.

FIG. 2 is a block diagram showing a detailed internal construction of the total control device 20. The total control device 20 is generally divided into a command block 21 for integrally controlling the playback and synthetic karaoke apparatuses, a data file block 22 for stocking song data used in the synthetic karaoke, and an acoustic/graphic block 23 having multiple functions. First, the command block 21 is comprised of a receiver 21A, a panel interface 21B, a request controller 21C, an indicator 21D, a driver 21E, an I/O selector 21F and an access interface 21G. The receiver 21A receives a command from the remote controller 50. The panel interface 21B admits another command inputted from a switch panel 24 (FIG. 1) installed in the front face of the total control device 20. The request controller 21C operates in response to a command of song request from either of the receiver 21A and the panel interface 21B so as to organize a plurality of song requests to effect selection and/or reservation of the requested karaoke songs. The indicator 21D is driven by the driver 21E to indicate item codes of the selected or reserved songs. The I/O selector 21F selects inputs and outputs of the audio and video signals.

The data file block 22 is comprised of a file sorter 22A, a communication controller 22B and a data storage 22C. The file sorter 22A receives the selected or reserved item codes of the karaoke songs from the request controller 21C. The communication controller 22B communicates to the host station 30 through the ISDN network 40. The data storage 22C stocks the song data received from the host station through the ISDN network 40 to form a data file as an open data source. In operation, when the file sorter 22A receives tile select or reserve command from the request controller 21C, the file sorter 22A initially accesses the data storage 22C to search if the song data of the requested karaoke song is stored. If stored, the searched song data is read out. On the other hand, if not stored, the communication controller 22B is activated to admit a requested song data from a database of the host station 30. The data storage 22C is comprised of, for example, a hard disc driver (HDD) having a capacity of 100 MB (megabyte) such that the HDD can stock one thousand songs provided that each karaoke song is prescribed by 10 KB (kilobyte) of song data in average.

The acoustic/graphic block 23 is comprised of a data buffer 23A, a multimedia sequencer 23B, a tone generating processor 23C, a video processor 23D and a video superimposer 23E. The data buffer 23A temporarily holds the song data supplied from the file sorter 22A. The multimedia sequencer 23B synchronously controls various events including generation of musical tones, display of pictures and application of additional effects according to event information contained in the composite song data or karaoke data. The tone generating processor 23C processes the song data to synthesize the musical tone of the karaoke song under the control by the sequencer 23B. The video processor 23D generates the background picture, the characters of the song words and else. The video superimposer 23E superimposes the graphic outputs of the video processor 23D with another picture such as a background motion picture which is recorded in a background video LD (BGV-LD) loaded in the LD changer 11.

The I/O selector 21F of the command block 21 coordinates the audio part of the karaoke performance such as to select either of the playback audio output from the LD changer 11 and the synthesized audio output from the tone generating processor 23C to feed the mixing amplifier 13. Further, the I/O selector 21F coordinates the video part of the karaoke performance such as to select either of the video output reproduced from the LD changer 11 and the other video output generated from the video superimposer 23E to feed the monitor CRT 12. If the LD changer 11 is disconnected from the I/O selector 21F, the synthetic karaoke apparatus and the playback karaoke apparatus are functionally independent from each other. The synthetic and playback karaoke apparatuses are integrated with each other by means of the I/O selector 21F and the access interface 21G, which are provided in the control device 20.

In the karaoke system as shown in FIGS. 1 and 2, the command block 21 operates in response to a song request from the remote controller 50 or else to initially check as to if the requested song is recorded in the closed and separate data source of the LD changer 11. Namely, the first priority is given to the playback karaoke apparatus 10 for efficient use of the audio video source recorded in the LD changer 11. If the LD changer 11 stores the requested karaoke song, its audio and video outputs are utilized to effect the karaoke performance. On the other hand, if the requested karaoke song is not found in the LD changer 11, the command block 21 passes an item code of the requested karaoke song to the file sorter 22A so as to utilize song data of the synthetic karaoke apparatus. In such a case, the database of the host station 30 is not accessed immediately, but the internal data storage 22C is accessed precedingly to check as to if the requested song data is stocked. If stocked, the requested song data is retrieved from the data storage 22C for the musical tone synthesis. Namely, the second priority is given to the open data file of the data storage 22C. Further, if the requested song is not found in the data storage 22C, the host station 30 is called to transmit therefrom the requested song data through the ISDN network 40. Namely, the third priority is given to the original database of the host station. In case that the synthetic karaoke apparatus is not provided with the data storage 22C, the song data retrieved from the host station is given the second priority.

FIG. 3 shows a detailed construction of the inventive karaoke system. The disclosed embodiment contains additional components and equipments not explicitly illustrated in FIGS. 1 and 2. For example, a central processing unit (CPU) 61 is provided to undertake overall control of the karaoke system according to a program ROM installed in the multimedia sequencer 23B. A random access memory (RAM) 62 provides a working area used when the CPU 61 undertakes the overall control of the karaoke system. A data and address bus line 63 connects the various components and equipments altogether to constitute the karaoke system. A MIDI interface 64 is provided to connect to an external electronic musical instrument 42. A changer controller 65 controls the LD changer 11. The changer controller 65 can be selected according to a model type of the LD changer 11.

An ADPCM decoder 66 is provided to undertake bit-conversion and frequency-conversion to expand an adoptive delta pulse code modulation (ADPCM) data containing compacted audio signals fed from the multimedia sequencer 23B. A pitch shifter 67 is connected to the ADPCM decoder 66 for controlling the tone pitch of the decoded audio signal according to key information provided from the multimedia sequencer 23B. An effect mixer 68 receives the outputs of the pitch shifter 67 and the tone generating processor 23C. The tone generating processor 23C functions as a music synthesizer driven by a song data to synthesize an audio signal of the karaoke song. The tone generating processor 23C is comprised of a tone generating unit for synthesizing the musical tone based on the MIDI data or else and a controlling unit. A microphone effector 69 imparts an acoustic effect such as an echo, an excitement, a harmonization and else to an output of the microphone 14. A digital sound field processor (DSP) 70 is provided to impart a sound field effect to the outputs of the tone generating processor 23C and the microphone effector 69 and the audio output of the LD changer 11.

On the other hand, the video processor 23D processes character information representative of words and else associated to the performed song, and background picture information representative of still and motion pictures so as to generate a video signal for display. In this embodiment, the video processor 23D is divided into two units 23D1 and 23D2. The one video processor unit 23D1 generates the song word characters to output a video signal VIDEO 1, and the other video processor unit 23D2 generates the background pictures to output the video signal VIDEO 2. The LD changer 11 is operated to reproduce the karaoke song recorded in the Laser Disc in the playback karaoke mode, or otherwise to reproduce image information alone for use in the synthetic karaoke mode. More particularly in the synthetic karaoke mode, the LD changer 11 is operated in synchronization with the karaoke accompaniment synthesized by the tone generating processor 23C to output a video signal VIDEO 0 representative of a still picture recorded in a given frame of a given Laser Disc, or representative of a motion picture which starts from a given frame. The video superimposer 23E superimposes these video signals VIDEO 0, VIDEO 1 and VIDEO 2 with each other to form a composite picture.

Further, a down loader 71 of the portable type is utilized to load a package of the song data into the storage (HDD) 22C without using the ISDN network 40. For example, when the inventive karaoke system is installed at a given user spot, a supplier brings the portable down loader 71 to the user spot to load the package of song data at once. By such a volume loading, the user can save a long time communication with the host station 30 through the ISDN network 40, which would be needed for transfer of the great volume of the composite song data.

Hereinafter, detailed description will be given to significant aspects of the inventive karaoke system in conjunction with the drawings.

Playback/Synthesis Control

When the remote controller 50 or the switch panel 24 is actuated to designate a karaoke song to be performed, the CPU 61 refers to an index table stored in the data storage 22C to check as to if the designated song is recorded in the LDs of the auto-changer 11 which is given the first priority. If recorded, the designated song is reproduced from the LD in the playback mode. The auto-changer 11 outputs the audio signal which is transmitted to the loudspeaker 15 through the DSP 70, and concurrently outputs the video signal VIDEO 0 which is transmitted to the monitor CRT 12 through a selector section of the video superimposer 23E. On the other hand, the live voice of the singer is converted by the microphone 14 into an electric signal which is fed to the DSP 70 through the microphone effector 69. The mixing amplifier 13 mixes the accompaniment part and the vocal part with each other so that the loudspeaker 15 produces the mixed audio output, i.e., karaoke performance.

If the designated song is not recorded in the LD changer 11, the CPU 61 searches the song data stocked in the HDD storage 22C which is given the second priority. If the designated song is stocked in the data storage 22C, the song data is retrieved and loaded into the RAM 62. The tone generating processor 23C operates according to the song data to synthesize the musical tones to effect the karaoke performance. Such a synthesis of the musical tone is carried out under the control by the multimedia sequencer 23B. With regard to the audio part, the tone generating processor 23C successively generates the musical tone signal according to the digital song data read out from the RAM 62. The musical tone signal is acoustically reproduced by the loudspeaker 15 through the effect mixer 68, the DSP 70 and the mixing amplifier 13. With regard to the video part, the video processor units 23D1 and 23D2 produce the word characters and the background pictures, respectively, according to graphic information contained in the song data under the control by the multimedia sequencer 23B in synchronization with progression of the song. The generated word characters and background pictures are visually displayed by the monitor CRT 12 through the video superimposer 23E. Additionally, another background picture reproduced from the LD changer 11 may be also superposed to the background picture and the word characters by the video superimposer 23E. The word characters are variably displayed by the monitor CRT 12 such that a color of the displayed words is sequentially changed in synchronization with progression of the song so as to teach the player vocal timings. Accordingly, the player can sing a song while handling the microphone 14 and following the word characters displayed on the monitor CRT 12.

If the designated song data is not stocked in the HDD storage 22C, the CPU 61 activates the communication controller 22B to take the designated song data from the host station 30 on line, which is given the third priority. Namely, the host station 30 is called through the ISDN network 40. When the host station 30 responds to the calling, the song item code is sent to request the designated song data. The taken song data is stocked in the HDD storage 22C for re-use.

Format and Content of Composite Song Data

The synthetic karaoke apparatus is driven by the composite song data which has a data format generally shown in FIG. 4(*a*). The composite song data is comprised of a header and a subsequent serial train of a word track, an accompaniment track, an additional control track and so on. The additional control track carries control information effective to automatically control additional equipments such as the DSP 70, the microphone effector 14 and else. Each track has a similar alternate arrangement of a duration and an event. The song data is transferred from the host station in the serial format so that the transfer of the composite song data is completed when the last track is received. Therefore, the karaoke performance is started after the last track is received by the karaoke system. The player must wait for a considerable time interval after the request to actually start the karaoke performance. For example, the typical song data has a length of 15 KB–20 KB for the header and 100 KB from the word track to the control track. Such a length of the song data is transferred by about 15 seconds through the fast ISDN network having a data transfer rate of 8 KB per second. Actually, this net transfer time is added by overheads such as a calling time of the host station, a database access time in the host station and else so that the total transfer time reaches more or less 20 seconds. This waiting time is ten or more times as long as the retrieval time of the song data from the HDD, which is in the order of 1–2 seconds.

In view of this, the data transfer format is arranged as shown in FIG. 4(*b*) in the inventive karaoke system. Namely, in the original song data format shown in FIG. 4(*a*), the word track is divided into time-sequential sections of A1, A2, . . . , AN, the accompaniment track is likewise divided into time-sequential sections of B1, B2, . . . , BN, and the additional control track is likewise divided into time-sequential sections of C1, C2, . . . , CN. Then, as shown in the FIG. 4(*b*) format, the first sections A1, B1 and C1 are collected from the respective tracks to compose a first track. Similarly, the second sections A2, B2 and C2 are collected to form a second track. In similar manner, the N-th sections AN, BN and CN are collected to form an N-th track. For example, in case of N=6, the data transfer of the first track having the length of about 15 KB is completed by about 2 seconds. The preceding data transfer of the header requires about 2 seconds, hence only 4 seconds are spent to receive the first track. Even if an overhead is added, the receipt of the first track may be finished by about 8 seconds. Upon receipt of the first composite track, the karaoke system obtains a top part of all the performance information including the song word data, the accompaniment event data, the control event data and else to thereby readily start the top part of the karaoke performance accompanied by the word display and additional events. In estimation, the song data representative of a music piece of 3 minutes length is divided into the first track through the sixth track such that the karaoke system can commence about 30 seconds of the karaoke performance according to the first track of the song data. Accordingly, the karaoke system commences the karaoke performance after the first track is received, while the second and further tracks are continuously entered. After the performance of the first track is finished, the second track is performed while the remaining tracks are continuously entered. By such a manner of flying start, the karaoke system immediately initiates the karaoke performance to finish the same without interruption, while the song data is transferred in parallel to the karaoke performance.

Multimedia Sequencer

Figures 4A, 4B:
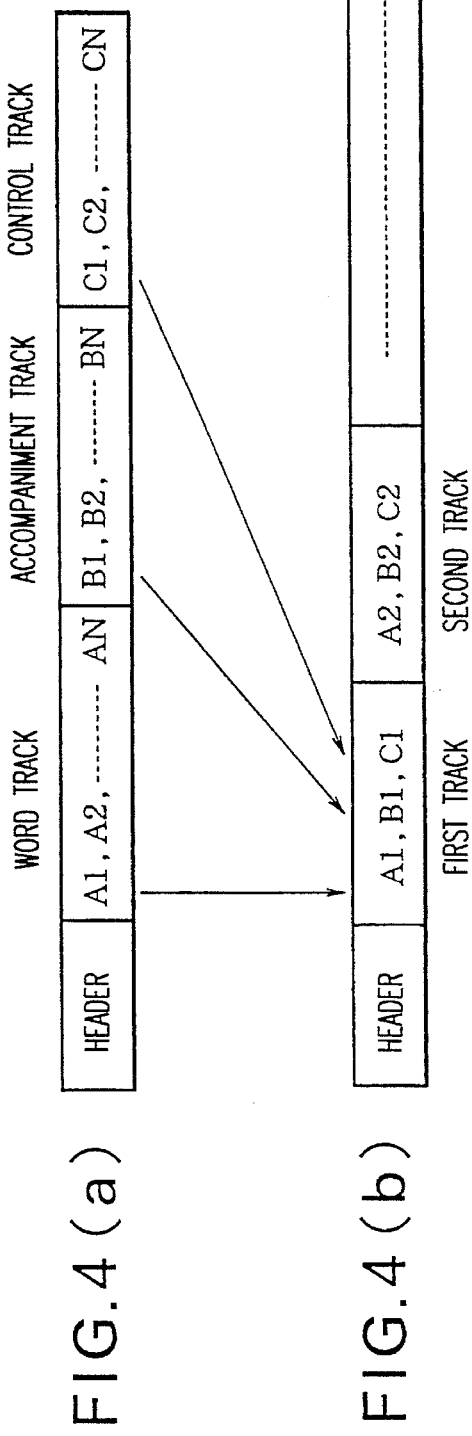
FIG. 4(a) and 4(b) are a schematic diagram showing a composite song data format adopted in the inventive system.

The multimedia sequencer 23B is basically composed of an MIDI sequencer and is provided with operating system (OS) function to concurrently execute parallel tasks. Consequently, the multimedia sequencer 23B can execute in real time basis a multiple of events of plural tracks contained in one composite song data in synchronization with each other under the software control. The "event" covers a wide variety of representations involved in the karaoke performance, including instrumental accompaniment, song word display, background picture, sound effect, external instrument control and so on. The multimedia sequencer 23B receives the song data which is read out from the working RAM 62 by means of the CPU 61. As shown in FIG. 4(a), the composite song data is composed of the word track, the accompaniment track in the form of an MIDI track, and the additional control track. The multimedia sequencer 23B distributes the MIDI data or accompaniment event data to the tone generating processor 23C to synthesize the karaoke accompaniment. Moreover, the sequencer 23B controls the additional or peripheral equipments according to various event information contained in the additional control track so as to regulate the additional events such as application of effects.

Figure 5:
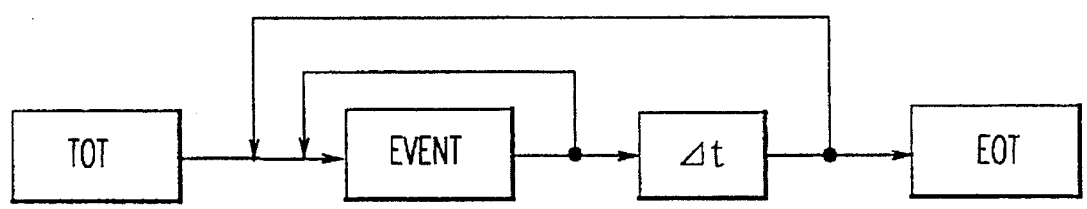
FIG. 5 is an illustrative diagram showing a routine of executing main events.

Referring to FIG. 5, the main MIDI track is comprised of an alternate arrangement of an accompaniment event and a duration (waiting interval) Δt, which starts from the top of track (TOT) and terminates by the end of track (EOT). The sequencer 23B sequentially processes each event in repetitive manner as indicated by the arrows of FIG. 5.

Figure 6:
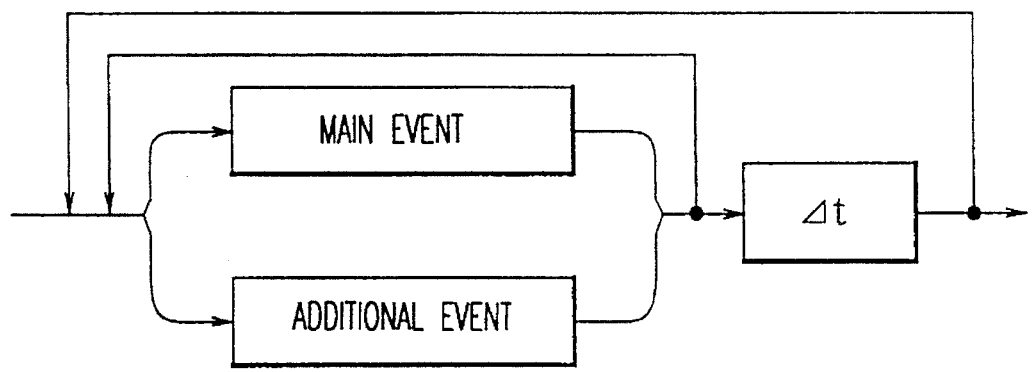
FIG. 6 is an illustrative diagram showing a routine of executing additional events concurrently with the main events.

On the other hand, in case that the song data is added with the control track shown in FIG. 4(a), the additional control event is executed in parallel to execution of the main accompaniment event as illustrated by FIG. 6. The additional event is prescribed in the control track, hence the timing of executing the additional event can be synchronized with the main event which is prescribed in the accompaniment track under the software control. The additional control event may include turn-on of microphone echo, selection of a particular sound field, turn-off of microphone echo and so on.

Sound Field Effect Control and Acoustic Effect Control

Referring to FIG. 7, the sequencer 23B controls the effect mixer 68, the microphone effector 69 and the digital sound field processor (DSP) 70 in synchronization with the progression of the karaoke performance in addition to the control of the tone generating processor 23C. The effect mixer 68 receives the instrumental accompaniment tones from the tone generating processor 23C through a multiple of channels, such as a guitar tone from the channel 1, a piano tone from the channel 2, a violin tone from the channel 3 and so on. The effect mixer 68 receives also the output of the ADPCM decoder 66 through the pitch shifter 67, representative of a vocal chorus waveform data carried by an ADPCM track of the composite song data. The effect mixer 68 has a programmable effector 68B at its input stage for selectively distributing the respective channel outputs to a succeeding processor 68B according to a select control signal fed from the sequencer 23B. The processor 68B imparts various acoustic effects such as echo, equalizing, reverberation and else to the selected channel outputs.

The digital sound field processor (DSP) 70 receives the output of the effect mixer 68 to apply thereto a desired sound field according to a control signal in the form of the sound field event data fed from the sequencer 23B in matching with the karaoke performance. The sound field processor 70 digitally forms a plurality of echo waveforms having different delays and magnitudes based on the inputted waveform to synthesize a musical sound. Consequently, a desired spread of the sound field is obtained as if the song is performed in a concert hall, a live spot or else. The sound field processor 70 can be coupled to a sound system composed of multiple loudspeakers 15 to more efficiently generate the sound field. For example, the sound system may be composed of six or seven units of the loudspeakers arranged such that four units are positioned front right, front left, rear right and rear left, respectively, and three additional units are positioned front middle, center left and center right, respectively. Such a sound field system is disclosed in the U.S. Pat. Nos. 5,027,687 and 5,261,005.

The microphone effector 69 is optionally connected to the sound field processor 70 in the present embodiment. The microphone effector 69 imparts to the singing voice picked up by the microphone various desired acoustic effects such as monoral-to-stereo conversion, echo, excitation, harmonization, equalizing and else. The microphone effector 69 is operated according to a timing control signal in the form of an acoustic effect event data fed from the sequencer 23B so as to generate the acoustic effects in synchronization with the progression of the karaoke performance.

As described above, the sequencer 23B provides the timing control signals effective to control the sound field processor 70, the effect mixer 68 and the microphone effector 69. The sequencer 23B may provide additional timing control signals effective to control other equipments including a display, an illumination and a stage. All the control signals are generated according to time-sequential event data prescribed in the additional control track involved in the composite song data. The multimedia sequencer 23B reads out the control track from the RAM 62 concurrently with other tracks including the MIDI track so as to totally systemize all the equipments in synchronization with the karaoke performance.

In modification, a kind of the sound field created by the DSP 70 can be prescribed as an event data in the composite song data differently for each song or each phrase of one song. Consequently, the sequencer 23B operates based on the event data to control the DSP 70 such that the kind of the created sound field can be automatically set in matching with the mood of each song or each phrase. Similarly, a kind and a degree of the acoustic effect added by the microphone effector 69 can be prescribed as a control event data in the composite song data such that the kind and the degree of the added acoustic effect can be automatically set in matching with progression of the karaoke performance. In such a case, the degree of the acoustic effect can be varied intensively corresponding to a climax of the karaoke performance. As described above, according to the invention, the multimedia sequencer has multiplex functions to carry out multiple tasks in parallel manner. The sequencer conducts multiple controls over additional or peripheral equipments besides the tone generating processor and the display so as to process the karaoke data containing additional event information to thereby automatically set and change the sound field, the acoustic effect and else in matching with the mood or progression of the karaoke performance.

What is claimed is:

1. A karaoke apparatus responsive to a song request for sounding an automatic accompaniment mixed with a singing voice to produce a karaoke performance including an audio component, the apparatus comprising:

supply means responsive to a song request for supplying a composite song data containing an accompaniment event data and an additional effect event data;

sequencer means for time-sequentially processing the supplied composite song data to synchronously feed a first train of the accompaniment event data and a second train of the additional effect event data;

tone generator means operative based on the fed accompaniment event data for generating an automatic accompaniment so as to produce the audio component; and a processor that produces time varying effects in the audio component in response to the fed additional effect event data, wherein the effects in the audio component are synchronized to the time-sequential progression of the automatic accompaniment.

2. A karaoke apparatus according to claim 1 wherein the processor comprises means for imparting a sound field effect to the audio component of the karaoke performance.

3. A karaoke apparatus according to claim 1 wherein the processor comprises acoustic affecter means for imparting an additional acoustic effect to the singing voice of the karaoke performance.

4. A karaoke apparatus according to claim 1 including a plurality of means for imparting a plurality of effects to the karaoke performance, and wherein the sequencer means provides event data to the processor in synchronization with the time-sequential progression of the karaoke performance.

5. The apparatus of claim 2, wherein the means for imparting a sound field effect provides a plurality of echo waveforms having a plurality of magnitudes and delays based upon an input waveform to synthesize a musical sound.

6. The apparatus of claim 2, wherein the means for imparting a sound field effect generates a sound field through a plurality of loudspeakers.

7. A karaoke apparatus for sounding a karaoke accompaniment in response to a song request, comprising:

supply means responsive to a song request for supplying a composite song data containing a karaoke accompaniment event data and a sound field effect event data;

sequencer means for time-sequentially processing the supplied composite song data to synchronously feed a first train of the karaoke accompaniment event data and a second train of the sound field effect event data;

tone generator means operative based on the fed karaoke accompaniment event data for generating a karaoke accompaniment; and sound field means for imparting a time varying sound field effect to the karaoke accompaniment in response to the second train of the sound field effect event data, wherein the sound field effect in the karaoke accompaniment is synchronized to the time sequential progression of the composite song data.

8. The apparatus of claim 7, wherein the sound field means provides a plurality of echo waveforms having a plurality of magnitudes and delays based upon an input waveform to synthesize a musical sound.

9. The apparatus of claim 7, wherein the sound field means generates a sound field through a plurality of loudspeakers.

10. A karaoke apparatus responsive to a song request for sounding a karaoke accompaniment mixed with a processed singing voice, the apparatus comprising:

supply means responsive to a song request for supplying a composite song data containing a karaoke accompaniment event data and an acoustic effect event data;

sequencer means for time-sequentially processing the supplied composite song data to synchronously feed a train of the karaoke accompaniment event data and another train of the acoustic effect event data;

tone generator means operative based on the fed karaoke accompaniment event data for generating a karaoke accompaniment; and a processor responsive to a singing voice and the fed acoustic effect event data to provide the processed singing voice having acoustic effects synchronized with the time-sequential progression of the karaoke accompaniment.

11. A karaoke apparatus responsive to a song request for sounding an automatic accompaniment mixed with a singing voice to produce a karaoke performance having an audio component and a plurality of additional multimedia events, the apparatus comprising:

supply means responsive to a song request for supplying a composite karaoke data having a main track carrying an accompaniment event data and an additional track carrying additional multimedia event data;

tone generator means operative based on the supplied main track of the accompaniment event data for generating an automatic accompaniment;

multimedia sequencer means for time-sequentially processing the additional track in synchronization with the main track to provide synchronized multimedia event data; and a plurality of multimedia output devices including an audio processor, said output devices providing multimedia events in response to the synchronized multimedia event data, wherein the audio processor produces time-varying effects in the audio component of the karaoke performance in response to the synchronized multimedia event data, wherein the time-varying effects in the audio component are synchronized to the time-sequential progression of the automatic accompaniment.

12. A karaoke apparatus according to claim 11 wherein the multimedia output devices comprise those imparting additional multimedia events selected from a group consisting of sound field events acoustic events associated with a singing voice, display events associated with song words and background picture illumination events applied to a singer and stage events.

* * * * *